455-115 SR
FIP8102 OR 3,914,693

United States Patent [19]
Ohlen

[11] 3,914,693
[45] Oct. 21, 1975

[54] CALIBRATION TEST APPARATUS

[75] Inventor: Gilbert M. Ohlen, Richardson, Tex.

[73] Assignee: Rockwell International Corporation, El Segundo, Calif.

[22] Filed: July 10, 1974

[21] Appl. No.: 487,097

[52] U.S. Cl. .......... 325/134
[51] Int. Cl.[2] .......... H04B 1/02
[58] Field of Search .......... 325/134, 133, 363, 31; 332/20; 324/78 R, 78 F, 78 N, 78 Z, 79 R; 331/18, 30, 31, 44

[56] References Cited

UNITED STATES PATENTS 2,293,022 8/1942 Crosby .......... 325/134 X

*Primary Examiner*—Robert L. Griffin
*Assistant Examiner*—Robert Hearn
*Attorney, Agent, or Firm*—Bruce C. Lutz

[57] ABSTRACT

A test device for calibrating an FM transmitter as to its frequency deviation with a given frequency test tone input signal of a predetermined amplitude. The device operates by supplying the test tone to a microwave transmitter and mixing a signal representative of the output of the transmitter with a locally generated signal of nearly the same frequency and low pass filtering the output of the mixer. This output is then monitored for a null condition as a frequency deviation adjusting mechanism in the transmitter is adjusted to produce a null output from the low pass filter.

2 Claims, 1 Drawing Figure

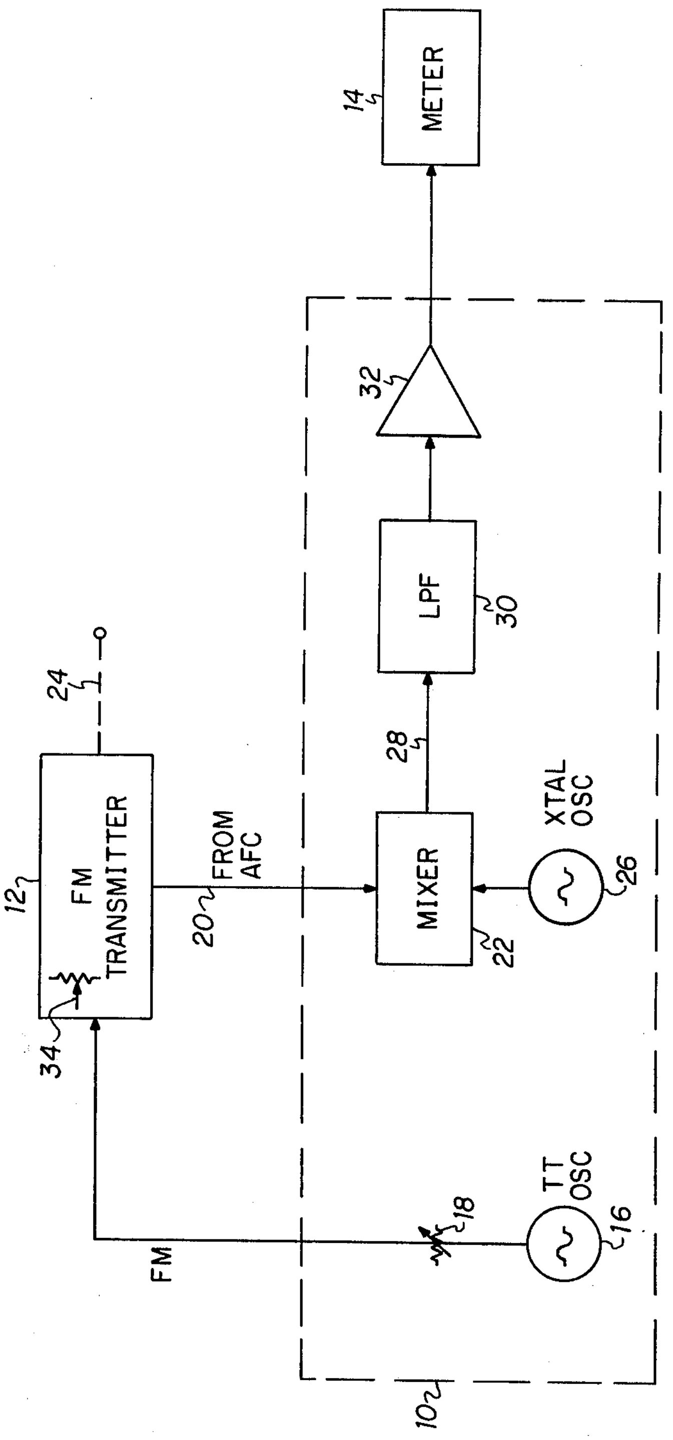
METER
LPF
MIXER
FM
TRANSMITTER
FROM
AFC
XTAL
OSC
TT
OSC
FM
10
12
14
16
18
20
22
24
26
28
30
32
34

CALIBRATION TEST APPARATUS

THE INVENTION

This invention pertains generally to FM transmitters and more specifically to a method of calibrating the frequency deviation of a FM transmitter with a predetermined input signal.

Many methods have been utilized in the past to measure the modulation index of an FM transmitter whereby the frequency deviation thereof can be calibrated. An example of three of the methods may be found in an October 1973 issue of Microwaves on page 85. These methods, however, have a disadvantage of requiring the use of expensive test equipment such as a microwave link analyzer or a spectrum analyzer. Deviation calibrators of other types have been manufactured by the assignee of the present application but the equipment involved required such expensive components that these devices were not practical for use in the field.

The present invention, on the other hand, is a relatively inexpensive device of simple construction and allows the calibration of an FM transmitter in the field with equipment designed for field use. This is possible because the components themselves are very few and relatively inexpensive and rugged.

The present inventive concept involves applying a test tone of a given amplitude and frequency to an input of a microwave transmitter. An output signal which may be taken either from the actual FM output or from other sources such as the automatic frequency control signal in the feedback loop is mixed in the test device with a locally generated signal of approximately the same frequency. The difference in frequencies of the two signals being applied to the mixer must, in order for the inventive concept to work, be less than the test tone signal. For best results the difference in frequencies applied to the mixer will be substantially less than the test tone frequency. The products of the mixer are applied to a low pass filter which removes all frequencies except the difference frequency of the two signals applied and supplies the remaining signal to some type of measuring or indicating device whereby a null indication may be obtained. A potentiometer or other frequency deviation adjusting device within the transmitter is then adjusted from a position of a minimum frequency deviation until the first null is obtained. This first null constitutes what is known in the art as a Bessel-zero carrier null point. Such a point or phenomenon has been known for many years but the present concept is the first practical utilization of this concept in an economical field usable device. The carrier null phenomenon is based on the fact that the carrier null of a transmitter occurs at various points such as an output frequency deviation from the basic carrier frequency of 2.404 times the modulating frequency. Other carrier nulls or Bessel-zero points occur at 5.520 and 8.654 as well as other frequency deviation points. However, the present inventive concept utilizes only the first modulation index of 2.404.

It is thus an object of the present invention to provide an economically feasible null test set device for use in calibrating the frequency deviation of FM transmitters.

Other objects and advantages of the present invention may be ascertained from a reading of the specification and appended claims in conjunction with the single FIGURE which illustrates in block diagram form the inventive concept and the practice thereof.

In the FIGURE a dash-line block 10 encloses several components constituting a test set. In addition a FM transmitter 12 and a meter or null indication device 14 are illustrated outside the block diagram 10. A test tone oscillator 16 has an output illustrated as passing through an attenuation pad or variable resistor 18 before being applied to a test tone input of the FM transmitter. An output of the FM transmitter labeled 20 is applied to a mixer 22. As illustrated this output 20 is obtained from an automatic frequency control portion of the transmitter and in one embodiment was of a frequency of approximately 70 MHz. The output of the FM transmitter, illustrated as a dash-line 24, in this particular transmitter, operates at a carrier frequency of 2 GHz. A local crystal oscillator 26 applies a second signal to the mixer 22. In one embodiment of this invention, this crystal oscillator operated at a frequency of 70.001 MHz. Thus, there was a difference in frequencies applied to the mixer of approximately 1 KHz. An output of the mixer is applied on a lead 28 to a low pass filter 30 and from there to an amplifier 32. Amplifier 32 is basically an isolation amplifier for isolating the output of the low pass filter 30 from the meter 14.

If so desired, a higher frequency crystal 26 could be used in the neighborhood of 2.000001 GHz. and, thus, the output of the FM transmitter could be checked directly rather than checking the output from the automatic frequency control feedback loop of the transmitter. However, the AFC signal was convenient for use in the presently illustrated embodiment.

In operation a variable potentiometer indicated as 34 within transmitter 12 is set to a minimum frequency deviation for initialization. The output of test tone oscillator 16 is adjusted in amplitude by attenuation pad 18 at a given frequency to provide a given input $F_m$ which is the test tone input. The modulation index of an FM transmitter may be defined as:

$M = \Delta F_c/F_m$ where $M$ = modulation index $\Delta F_c$ = peak carrier deviation in Hz.

$F_m$ = the modulation frequency in Hz. at a predetermined amplitude.

As previously discussed briefly, the carrier null phenomenon teaches that at the modulation indexes of 2.404 etc., which are Bessel zeros, the carrier signal disappears and all of the carrier power is in the sidebands which are products of the multiples of the modulation frequency. The point at which the carrier power first goes to zero is said to be "the first Bessel zero or first Bessel null." This first Bessel null occurs when the value of the modulation index is equal to 2.404. More information on Bessel null point may be obtained from any of several sources such as Modulation, Noise and Spectral Analysis published by McGraw Hill in 1965 and authored by Phillip F. Panter.

Applying the above information to the present FIGURE, it will be noted that by adjusting the potentiometer 34, the deviation of the frequency of the carrier from its base frequency will increase as potentiometer 34 is changed. If this signal or a subharmonic thereof such as 70 MHz is mixed in the mixer 22 with the crystal frequency of 70.001 MHz, output frequencies will be obtained of 1 KHz and sidebands of the modulating frequency. If the frequency of the $F_m$ signal is chosen to be 100 KHz, the outputs on lead 28 will be in one example, 1 KHz, 100 KHz, 200 KHz and 300 KHz. Other harmonics may also appear at lower amplitude values. The output of lowpass filter 30 will be only the one KHz low frequency signal which is passed by filter 30. Thus, the meter 14 will provide an indication only of the 1 KHz difference signal.

As may be ascertained from any of various textbooks, such as referenced above, starting with a zero frequency deviation condition, the amplitude of the carrier will decrease as the frequency deviation is increased while the first, second and third sidebands will increase in amplitude. At the first Bessel null, the second and third sidebands are still increasing while the first sideband is starting to decrease and the carrier signal amplitude is at a minimum.

It will thus be ascertained that the amplitude components of the sidebands are fairly substantial at the first Bessel null but the carrier signal amplitude is essentially zero. Thus, the 70 MHz subharmonic of the FM transmitter which is obtained by mixing the 2 GHz signals within the transmitter with a 2.070 GHz signal or a 1.930 GHz signal, will have a zero amplitude signal being applied to mixer 22 of exactly 70 MHz in frequency. Thus, the 1 KHz difference signal will also be reduced to a minimum value since the amplitude of the difference frequency components are products of the amplitudes of the signals being mixed.

While the present inventive concept has been discussed with respect to a wide frequency deviation transmitter, such as found in microwave environments, and specifically the FM transmitter involved in operating in the 2 GHz range, the same concept will apply to much narrower frequency deviation FM transmitters such as used in normal radio broadcasting. The only distinction involved in using the test set for calibrating the more common FM transmitters is that the crystal oscillator 26 will operate at a lower frequency with respect to that obtained from the transmitter. The 70.001 MHz oscillator which was used in the present embodiment had a tolerance of 5,000 Hz. To use the same concept with the normal radio broadcasting FM transmitters would require a crystal oscillator having a frequency tolerance of only a few hundred Hz and the lowpass filter would also have to be constructed to higher standards whereby the normal modulating frequency of a few thousand Hz would not pass through the filter as first, second, and third sidebands.

While a preferred embodiment of the inventive concept has been illustrated, I realize that other embodiments may be produced using the concepts described herein and I wish to be limited not by the particular embodiment illustrated but only by the scope of the inventive concept as claimed in the appended material, wherein

I claim:

1. The method of calibrating a frequency deviation adjustable frequency modulated transmitter for frequency deviation when the transmitter includes output means for providing an automatic frequency control (AFC) test signal directly indicative in frequency of the carrier frequency of the signal to be transmitted comprising the steps of:

generating a first signal of a predetermined amplitude and a first frequency;

applying the first signal to the frequency modulated transmitter for frequency modulating the carrier output thereof;

generating a second signal of a second frequency, the frequency of said second signal differing from the frequency of the AFC test signal by a lessor amount than said first frequency;

mixing the test signal and said second signal;

lowpass filtering the mixed test and second signals to pass only the difference frequency signal;

measuring the amplitude of the signal passed by filtering; and adjusting the frequency deviation of said transmitter until a first minimum amplitude measurement is obtained at which point the transmitter deviation is calibrated.

2. Apparatus for calibrating a frequency deviation adjustable frequency modulated transmitter for frequency deviation comprising, in combination:

transmitter means including output means for providing an automatic frequency control (AFC) test signal directly indicative in frequency of the carrier frequency of the signal to be transmitted and including input means;

test tone means for generating a first signal of a predetermined amplitude and a first frequency;

means connecting said test tone means to said input means of said transmitter means for frequency modulating the carrier output thereof;

oscillator means for generating a second signal of a second frequency, the frequency of said second signal differing from the frequency of the AFC test signal by a lessor amount than said first frequency;

mixing means for mixing the test signal and said second signal connected to said transmitter means and to said oscillator means;

filter means connected to said mixing means, for lowpass filtering the mixed test and second signals to pass only the difference frequency signals; and measuring means for providing an indication of the amplitude of the signal passed by filter means, the adjustment of a frequency deviation adjustment means of said transmitter, until a first minimum amplitude indication is obtained, representing the point at which the transmitter deviation is calibrated.

* * * * *